United States Patent
Yun et al.

(10) Patent No.: US 7,684,367 B2
(45) Date of Patent: Mar. 23, 2010

(54) APPARATUS AND METHOD FOR TRANSMITTING DATA USING MULTI-ROUND CONTENTION AVOIDANCE

(75) Inventors: Jeong-Kyun Yun, Anyang-si (KR); Sae-Woong Bahk, Seoul (KR); Jae-Hyun Ahn, Seoul (KR); Dai-Kwan Kim, Seoul (KR); Jong-Hyung Kwun, Seongnam-si (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 240 days.

(21) Appl. No.: 12/041,413

(22) Filed: Mar. 3, 2008

(65) Prior Publication Data
US 2008/0212477 A1   Sep. 4, 2008

(30) Foreign Application Priority Data
Mar. 2, 2007   (KR) ............... 10-2007-0020777

(51) Int. Cl.
*H04W 4/00*   (2009.01)
(52) U.S. Cl. ............................................. 370/329
(58) Field of Classification Search ............ None
See application file for complete search history.

(56) References Cited

U.S. PATENT DOCUMENTS 6,807,189 B1 *  10/2004  Fischer ..................... 370/447
7,386,014 B2 *  6/2008   Flemming et al. ........... 370/503
2002/0163933 A1 * 11/2002  Benveniste ................. 370/465
2003/0103521 A1 *  6/2003  Raphaeli et al. ............ 370/445
2005/0089045 A1 *  4/2005  Shim et al. ............. 370/395.42

OTHER PUBLICATIONS

Jae-Hyun Ahn et al., Tone-based Access Scheme with Repetitive Contention in IEEE 802.11 DCF, JCCI 2006, Apr. 2006.
Jeongkyun Yun et al., Multi-round Collision Avoidance for Contention-Based Medium Access Control, Institute of Korean Electronic Association, Nov. 25, 2006.

* cited by examiner

*Primary Examiner*—Kwang B Yao
*Assistant Examiner*—Juvena Loo
(74) *Attorney, Agent, or Firm*—Jefferson IP Law, LLP (57) ABSTRACT

An apparatus and method for transmitting data by using Multi-round Contention Avoidance (MrCA) are provided. The method includes initializing a contention window for each of a plurality of contention rounds and setting a backoff counter corresponding to a size of the contention window for each contention round, starting from a first contention round to a last contention round, decrementing a backoff counter of a corresponding contention round in a time slot unit and transmitting data when the decremented backoff counter is zero and when the corresponding contention round is a last contention round. Accordingly, the number of contending nodes is exponentially decreased for each contention round, resulting in significant decrease in a collision probability in addition to improving fairness on channel use among users.

20 Claims, 6 Drawing Sheets

APPARATUS AND METHOD FOR TRANSMITTING DATA USING MULTI-ROUND CONTENTION AVOIDANCE

PRIORITY

This application claims the benefit under 35 U.S.C. §119(a) of a Korean patent application filed in the Korean Intellectual Property Office on Mar. 2, 2007 and assigned Ser. No. 2007-20777, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co. Ltd. and Seoul National University Industry Foundation.

BACKGROUND OF THE INVENTION

1. Field of the Invention

The present invention relates to an apparatus and method for transmitting data by using Multi-round Contention Avoidance (MrCA). More particularly, the present invention relates to an apparatus and method for transmitting data by using MrCA in a wireless network employing a wireless random access channel or a distribution access scheme.

2. Description of the Related Art

Slotted ALOHA is an access scheme generally used in a next generation wireless access environment that uses a random access channel. In the slotted ALOHA scheme, when it is desired to transmit data using a wireless resource, a user attempts to transmit the data in a time slot immediately subsequent to the current time slot. If another user is using the same channel, the two users cannot successfully transmit a frame due to mutual interference, which leads to retransmission. In retransmission, the user waits for a random time to prevent the collision from occurring again, and then transmits the data in a corresponding slot. However, although the slotted ALOHA scheme has been designed aiming at simplicity, it has a significant shortcoming in terms of interference with other users. Specifically, a theoretical throughput of the slotted ALOHA is $e^{-1}$, or approximately 0.368. This means that, in practice, only about 37% of an entire channel is used in practical transmission under optimal conditions.

With a throughput of only 37%, it is not possible to provide services for a system such as a wireless Local Area Network (LAN) in which a random access scheme is generally used in data transmission. Therefore, the Institute of Electrical and Electronics Engineers (IEEE) 802.11 standard has proposed the use of a Carrier Sense Multiple Access with Collision Avoidance (CSMA/CA) scheme. In the CSMA/CA scheme, before a user attempts to transmit data through a wireless channel, the user first determines if another user is using the channel, and, in order to minimize collisions, waits for a random time before attempting to transmit the data even if no user is using the channel. In other words, in the CSMA/CA scheme, when the user has a frame to be transmitted, the user first determines a state of a wireless channel to be used, and, if a signal of another user is sensed, waits until the wireless channel is idle, and otherwise, immediately proceeds to a collision avoidance process. In the collision avoidance process, a random time is allocated, and then the user waits for that time before attempting to transmit data. The CSMA/CA scheme prevents data from being concurrently transmitted by several users through a non-busy channel, thereby reducing a collision probability. However, since the CSMA/CA scheme uses the wireless resource in a very cautious manner as compared to the slotted ALOHA scheme, the wireless resource is less effectively used in practice. In addition, there is a problem in that, even with a small number of users, time is not efficiently allocated, and with a large number of users, collision probability and performance deterioration are both increased. In particular, a collision avoidance function of the CSMA/CA scheme may cause an unequal distribution of resources, and thus a large amount of resources may be exclusively used by some users.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting data by using Multi-round Contention Avoidance (MrCA).

Another aspect of the present invention is to provide an apparatus and method for transmitting data by using MrCA in a wireless network employing a wireless random access channel or a distribution access scheme.

Another aspect of the present invention is to provide an apparatus and method for transmitting data by using MrCA capable of providing a high throughput in addition to improving fairness among users.

According to an aspect of the present invention, a data transmission method using MrCA in a contending node is provided. The method includes initializing a contention window for each of a plurality of contention rounds, setting a backoff counter corresponding to a size of the contention window for each of the plurality of contention rounds, starting from a first contention round to a last contention round, decrementing the backoff counter of a corresponding contention round, in a time slot unit; and transmitting data when the decremented backoff counter is zero and the corresponding contention round is a last contention round.

According to another aspect of the present invention, a data transmission apparatus using MrCA in a contending node is provided. The apparatus includes an initialization/setup unit for initializing a contention window for each of a plurality of contention rounds and for setting a backoff counter for each contention round corresponding to a size of the contention window, a decrementer for decrementing the backoff counter of a corresponding contention round in a time slot unit, starting from a first contention round to a last contention round, a comparator for determining whether the decremented backoff counter is zero and whether the corresponding contention round is the last contention round and a data transmitter for receiving the backoff counter which is zero of the last contention round from the comparator and for transmitting data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, an exemplary apparatus and method for transmitting data by using Multi-round Contention Avoidance (MrCA) will be described.

Figure 1:
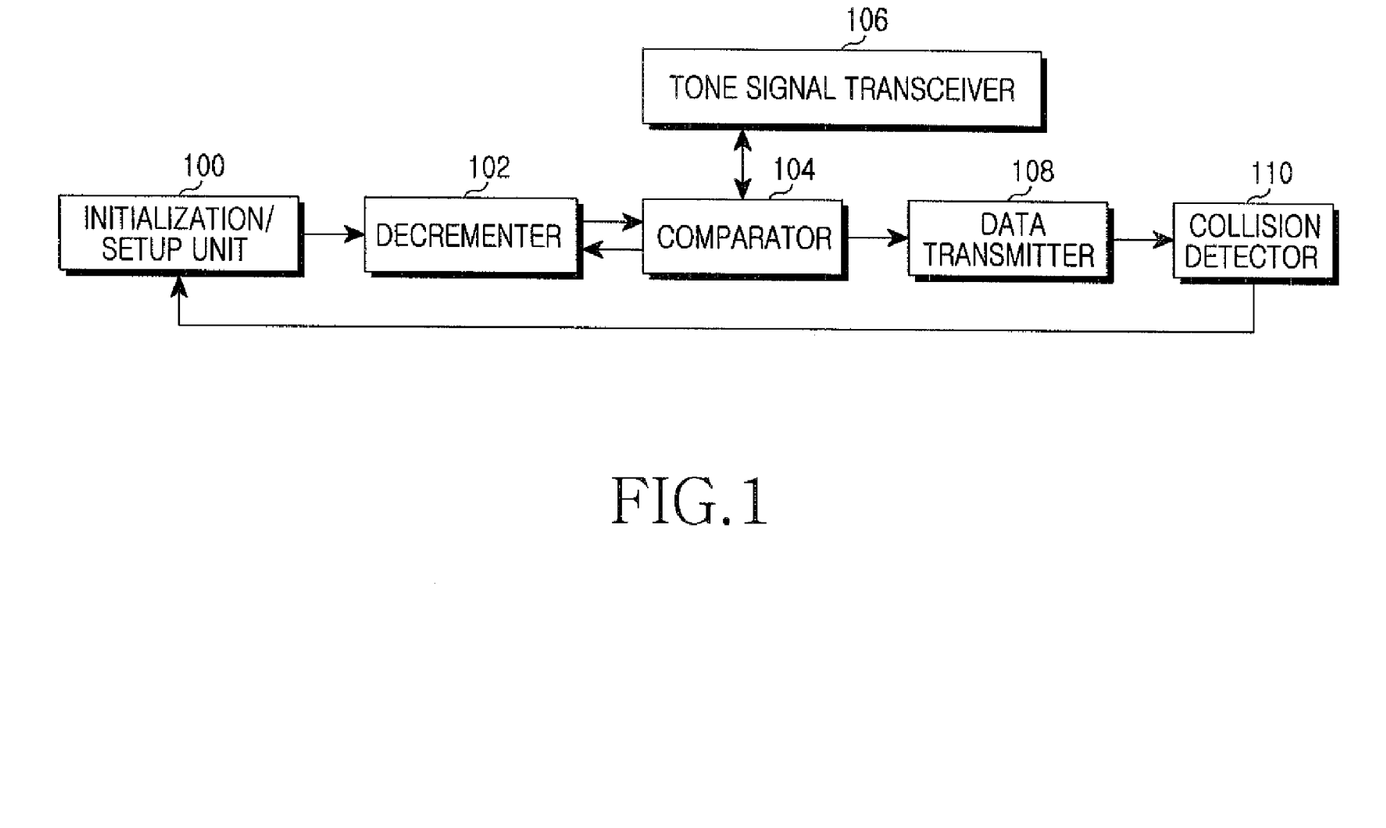
FIG. 1 is a block diagram illustrating a structure of an apparatus for transmitting data by using Multi-round Contention Avoidance (MrCA) in a Mobile Station (MS) according to an exemplary embodiment of the present invention.

FIG. 1 is a block diagram illustrating a structure of an apparatus for transmitting data by using MrCA in a Mobile Station (MS) according to an exemplary embodiment of the present invention.

Referring to FIG. 1, an exemplary apparatus includes an initialization/setup unit 100 for initializing a contention window and for setting a backoff counter, a decrementer 102 for decrementing the backoff counter, a comparator 104, a tone signal transceiver 106, a data transmitter 108, and a collision detector 110.

The initialization/setup unit 100 initializes a contention window for each contention round and sets a backoff counter for each contention round. In an exemplary implementation, the backoff counter for each contention round is set to a random value.

The decrementer 102 receives the backoff counter for each contention round from the initialization/setup unit 100, decrements the backoff counter of a first contention round, and outputs the decremented backoff counter to the comparator 104. In an exemplary implementation, the decrementer decrements the backoff counter in a time slot unit. The decrementer 102 also receives backoff counters of the remaining contention rounds from the comparator 104, decrements a backoff counter of a corresponding contention round in the time slot unit, and outputs the decremented backoff counter to the comparator 104.

The comparator 104 determines whether the backoff counter of the corresponding contention round, which is received from the decrementer 102, is equal to zero. If the backoff counter of the corresponding contention round is not zero, the comparator 104 determines whether a tone signal is received from a different MS by the use of the tone signal transceiver 106. If a tone signal is not received from a different MS, the comparator 104 outputs the backoff counter of the corresponding contention round to the decrementer 102. On the other hand, upon receiving a tone signal from a different MS, the comparator 104 waits (e.g. in a hold state) until a specific MS, which wins in a current contention, completes the transmission of data, and then outputs the backoff counter of the corresponding contention round to the decrementer 102. If a channel is not used for the transmission of data even after a time of $2(CW_{min+1})$ (herein, $CW_{min}$ denotes a minimum size of the contention window) elapses while in the hold state, the comparator 104 releases the comparator from the hold state, and outputs the backoff counter of the corresponding contention round to the decrementer 102. Meanwhile, if the backoff counter of the corresponding contention round is zero, the comparator 104 determines whether the corresponding contention round is a last contention round. If the corresponding contention round is not the last contention round, the comparator 104 transmits a tone signal by the use of the tone signal transceiver 106. In an exemplary implementation, the tone signal may be a short tone signal transmitted within one time slot. If the contention round is not the last contention round, the comparator 104 outputs the backoff counter (i.e., 0) of the corresponding contention round to the decrementer 102 so as to allow the decrementer 102 to decrement a backoff counter of a next contention round. Otherwise, if the corresponding contention round is the last contention round, the comparator 104 outputs the backoff counter (i.e., 0) of the last contention round to the data transmitter 108.

The tone signal transceiver 106 transmits the tone signal to a different MS under the control of the comparator 104 or outputs the tone signal received from a different MS to the comparator 104.

The data transmitter 108 transmits a data signal when the backoff counter (i.e., 0) of the last contention round is received from the comparator 104.

The collision detector 110 detects a collision in the transmitted data signal. If no collision occurs in the transmitted data signal, the collision detector 110 controls the initialization/setup unit 100 to set a backoff counter for a new contention round in order to transmit next data. In this case, the backoff counter of the first contention round is set to a value in the range of [1, CW+1], and the backoff counters of the remaining contention rounds are set to a value in the range of [0, CW]. On the other hand, if the collision occurs in the transmitted data signal, the collision detector 110 controls the initialization/setup unit 100 to double a contention window, starting from the first contention round to the corresponding contention round determined by the number of collisions, and to set a random backoff counter for each contention round.

Figure 2:
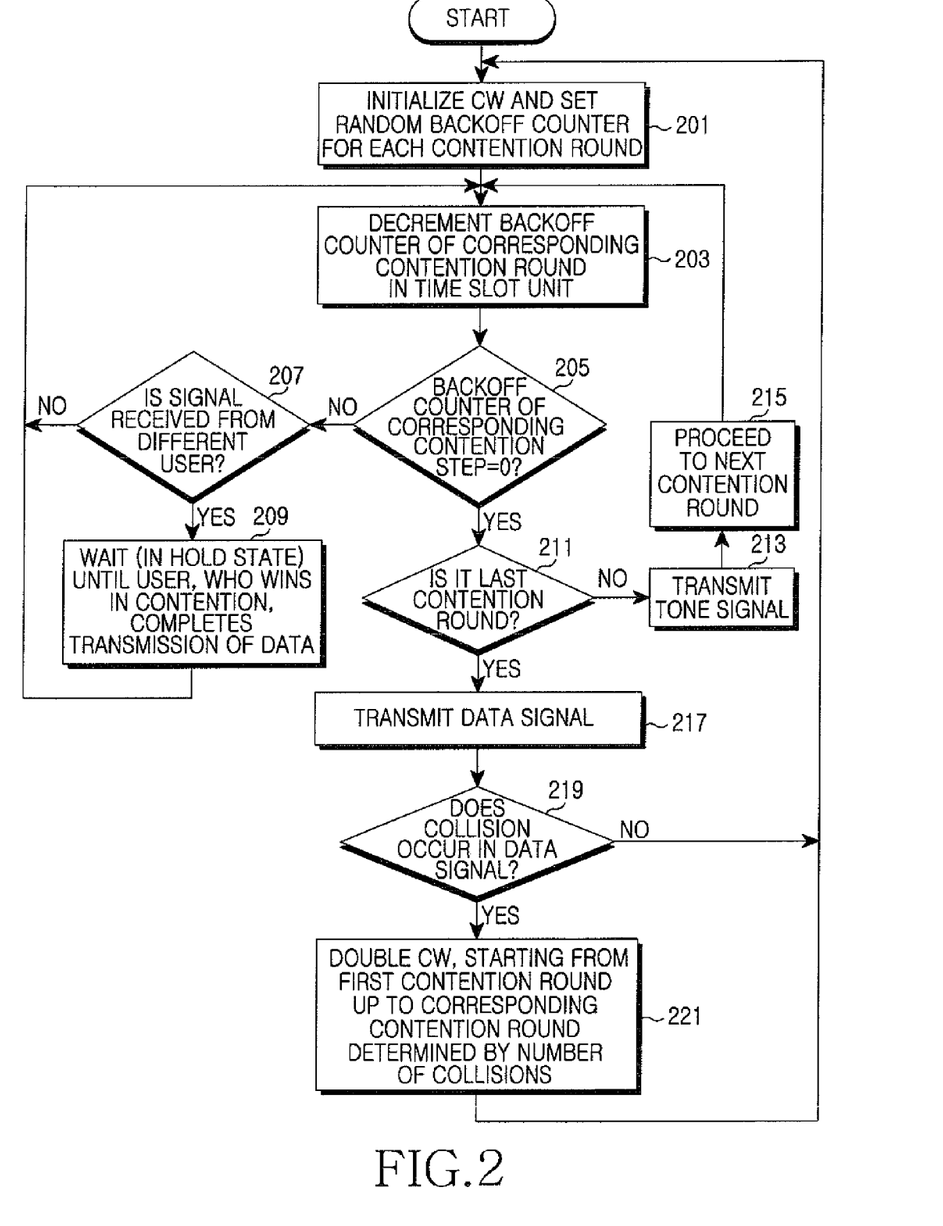
FIG. 2 is a flowchart illustrating a method of transmitting data by using MrCA in an MS according to an exemplary embodiment of the present invention.

FIG. 2 is a flowchart illustrating a method of transmitting data by using MrCA in an MS according to an exemplary embodiment of the present invention.

Referring to FIG. 2, in step 201, the MS initializes a contention window for each contention round, and sets a backoff counter, which may be randomly set, for each contention round. That is, if a total of G contention rounds are to be carried out by a plurality of MSs to transmit data, G contention windows and G backoff counters are set for the respective contention rounds. The backoff counter denotes a value, which may be a random value, allocated for contention in a corresponding contention round. The contention window represents a window or time duration during which the contention is processed and denotes a maximum value that can be set for the backoff counter. Thus, the backoff counter for each contention round is set to a value in the range of [0, CW], where CW denotes the size of the contention window.

In step 203, the MS decrements the backoff counter of a corresponding contention round and may decrement the backoff counter in a time slot unit. In the case of a step performed immediately after step 201, the corresponding contention round is a first contention round. In step 205, the MS determines whether the backoff counter of the corresponding contention round is zero. If the backoff counter of the corresponding contention round is not zero, the MS determines whether a tone signal is received from a different MS in step 207. In step 209, upon receiving a tone signal from a different MS for indicating the termination of counting, the MS suspends (e.g. puts a hold state) the decrementing of the backoff counter until a specific MS, which wins in a current contention, completes the transmission of data, then, the procedure returns to step 203. In this case, if a channel is not used even after a time of 2($CW_{min}$+1) (herein, $CW_{min}$ denotes a minimum size of the contention window) elapses after stopping the backoff counting due to the tone signal received from the different MS, the MS releases the hold state, and, returning to step 203, continues to decrement the backoff counter. This is to prevent a system from being halted by an interference signal. On the other hand, if a tone signal is not received from a different MS, returning to step 203, the MS repeats the subsequent steps.

If it is determined in step 205 that the backoff counter of the corresponding contention round is zero, the MS determines whether the corresponding contention round is the last contention round in step 211. If the corresponding contention round is not the last contention round, in step 213, the MS transmits a short tone signal so as to inform the different MSs that the backoff counting of the corresponding contention round has stopped. In step 215, the MS proceeds to a next contention round. Then, returning to step 203, the MS repeats the subsequent steps. In this case, a plurality of MSs finish the counting upon receiving the tone signal. However, MSs which transmit a tone signal proceed to a next contention round, and continue to participate in the contention. If it is determined in step 211 that the corresponding contention round is the last contention round, the MS determines that the MS acquires a chance to transmit a data signal in the current contention. Thus, in step 217, the MS transmits the data signal by using a wireless resource.

In step 219, the MS determines if a collision occurs in the transmitted data signal. For example, when a Non-ACKnowledge (NACK) signal is received as a response signal from a receiving side or when the response signal is not received within a time period, the MS may determine that a collision occurs in the transmitted data signal. If no collision occurs in the transmitted data signal, returning to step 201, the MS initializes the contention window for each contention round, sets the backoff counter for each contention round, and repeats the subsequent steps. In order to improve fairness, that is, in order to prevent an MS, which has acquired a chance to transmit data in a previous time period, from acquiring again a chance to transmit data in a current time period, a backoff counter is set to a value in the range of [1, CW+1], and for the remaining contention rounds, the backoff counter is set to a value in the range of [0, CW].

If it is determined in step 215 that a collision occurs in the transmitted data signal, in step 221, the MS doubles a contention window, starting from the first contention round to the corresponding contention round determined by the number of collisions. Then, returning to step 201, the MS sets the backoff counter for each contention round, and repeats the subsequent steps. If the collision occurs in a previously transmitted data signal, it is determined that the collision occurs due to a different MS having the same backoff counter. Thus, in order to reduce an afterward collision probability, the contention window is set to be greater than that in the previous time, thereby increasing a possibility that the MS has a backoff counter different from the different MS. According to an exemplary embodiment of the present invention, a method is proposed in which, when a $j^{th}$ collision occurs, a collision probability is further reduced by approximately doubling a contention window, starting from the first contention round to a $j^{th}$ contention round.

The contention window can be increased by using Equation (1) below.

$$\begin{cases} CW_i = 2CW_{min} + 1, & \forall_i \in \{i \mid 1 < i \le j\} \\ CW_i = CW_{min}, & \forall_i \in \{i \mid j < i \le G\} \end{cases} \quad (1)$$

Herein, $CW_i$ denotes a contention window of an $i^{th}$ contention round, and $CW_{min}$ denotes a minimum contention window. In addition, j denotes the number of collisions, that is, the number of times of attempting retransmission, and G denotes a last contention round. For example, if the number of collisions is 2, contention windows of first and second contention rounds are approximately doubled, and contention windows of the remaining contention rounds are maintained without alteration.

Figure 3:
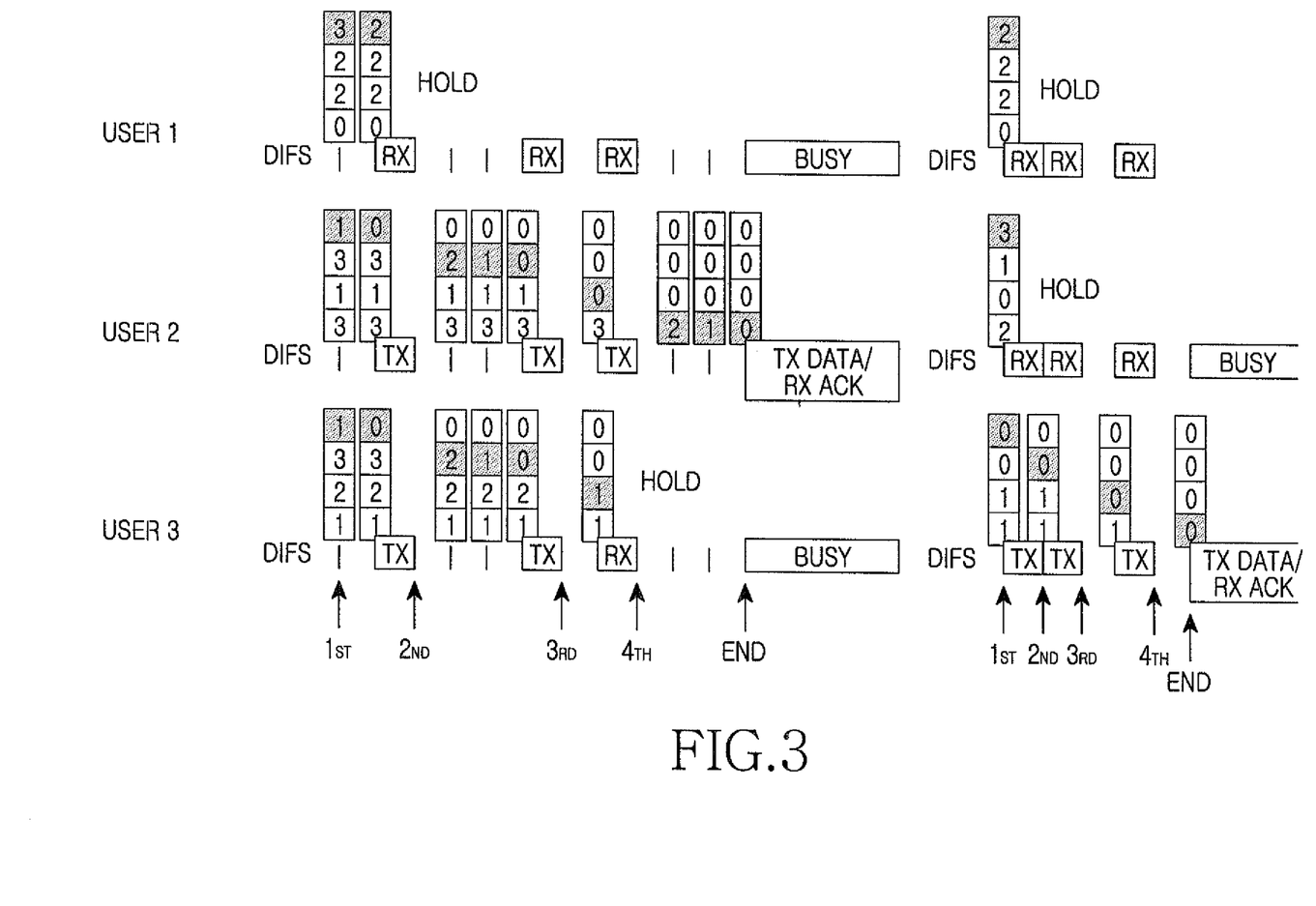
FIG. 3 is a diagram for illustrating an MrCA method according to an exemplary embodiment of the present invention.

Now, an operation of an MrCA method according to an exemplary embodiment of the present invention will be described with reference to FIG. 3. It will be assumed herein that three users (or MSs) participate in a quadruple contention, and $CW_{min}$ of each contention round is 3. In FIG. 3, a square box denotes a backoff counter at each slot, and a shadowed square box denotes a backoff counter of a current contention round.

First, a user 1, a user 2, and a user 3, after randomly setting backoff counters, have backoff counter vectors respectively of (3,2,2,0), (1,3,1,3), and (1,3,2,1). The first to fourth elements included in each parenthesis respectively denote backoff counters of first to fourth contention rounds. In the first contention round, after one slot elapses, the users 2 and 3 complete counting. At this time, each of the two users transmits a tone signal. Upon receiving the tone signals from the two users, the user 1 waits for a new contention in order to transmit next data while stopping the counting in a state of (2,2,2,0). In the second contention round, both the user 2 and the user 3 transmit the tone signal after three slots elapse. In the third contention round, the user 2 transmits the tone signal after one slot elapses, and thus the user 3, who receives the tone signal, stops the counting in a state of (0,0,1,1). In the fourth contention round, only the user 2 transmits data after three slots elapse. In this case, the user 2 may receive an ACKnowledge (ACK) signal as a response signal from a receiving side.

In a new contention for transmitting subsequent data, the three users again participate in the contention. The user 3, of which a counter for the first and second contention rounds is zero from a previous contention, continuously transmits a tone signal in a current contention, thus stopping the counting of other users and winning in the current contention.

Figure 4:
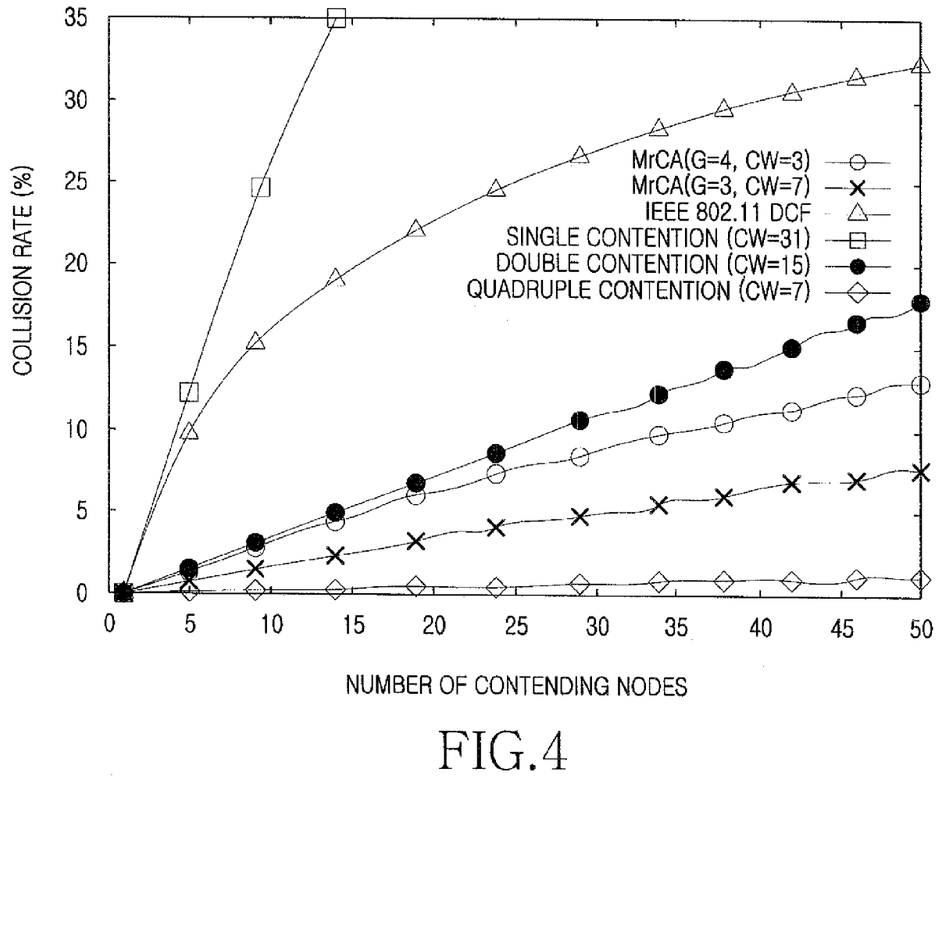
FIG. 4 is a graph for comparing a collision rate with respect to the number of contending nodes according to an exemplary embodiment of the present invention with a conventional method.

FIG. 4 is a graph for comparing a collision rate with respect to the number of contending nodes according to an exemplary embodiment of the present invention with a conventional method.

Referring to FIG. 4, in comparison with an IEEE 802.11 Distributed Coordinate Function (DCF), an exemplary Multi-round Collision Avoidance (MrCA) method of the present invention can reduce a collision rate to below 50%. In the graph of FIG. 4, G denotes the number of contention rounds, and CW denotes a size of the contention window. In addition, in FIG. 4, a single contention (CW=31), in which one round contention is carried out for 32 slots, a double contention (CW=15), in which the 32 slots are divided so that 16 slots of two contention rounds are carried out, and a quadruple contention (CW=7), in which the 32 slots are divided into four contention rounds, are compared with one another. Although the same 32 slots are used in all of the three cases, it can be seen that collisions can be much more effectively avoided when the slots are divided into several contention rounds. In particular, in the quadruple contention, a collision rate remains at about 1% even when the number of users reaches 50.

Figure 5:
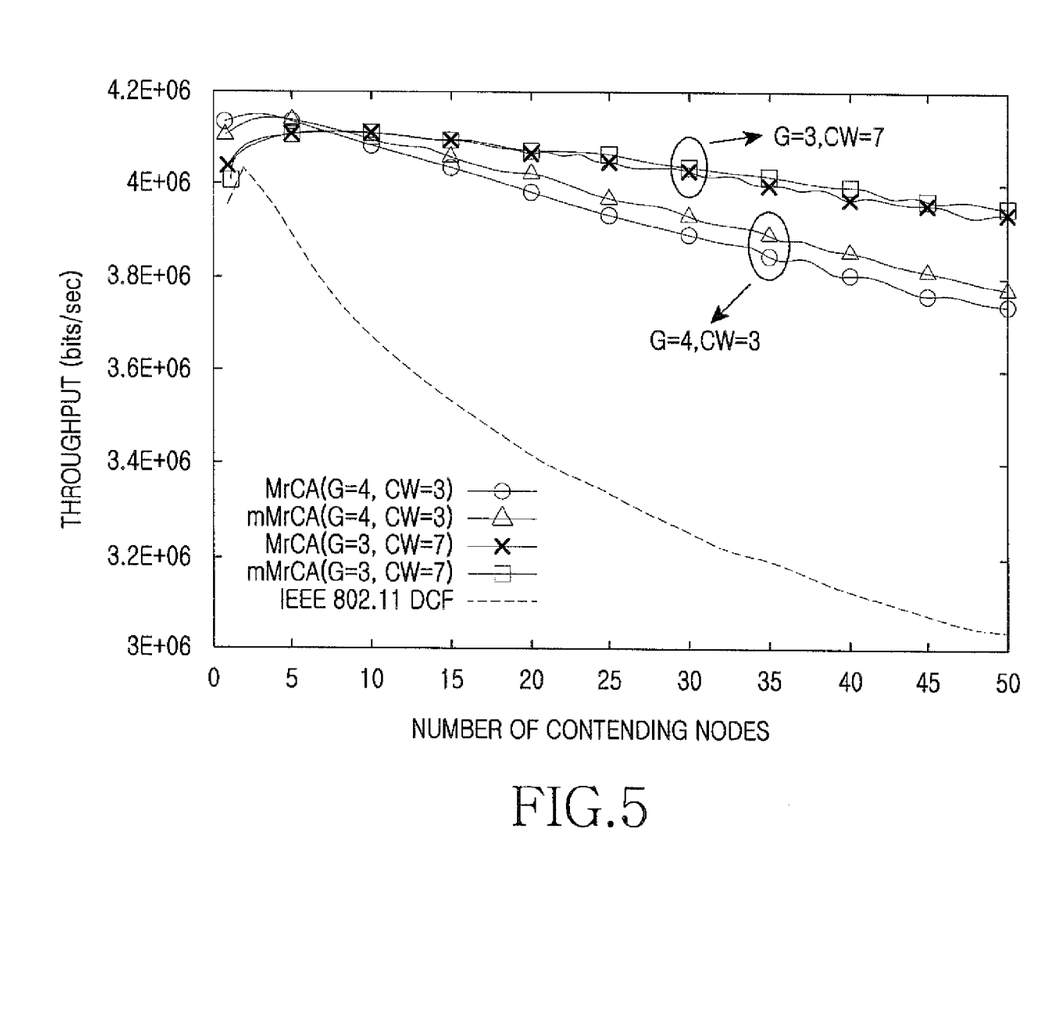
FIG. 5 is a graph for comparing a throughput with respect to the number of contending nodes according to an exemplary embodiment of the present invention with a conventional method.

FIG. 5 is a graph for comparing a throughput with respect to the number of contending nodes according to an exemplary embodiment of the present invention in comparison with the conventional method.

Referring to FIG. 5, an MrCA method according to an exemplary embodiment of the present invention can improve a throughput by approximately 25% in comparison with an IEEE 802.11 DCF. In the graph of FIG. 5, the MrCA results from allocating a backoff counter of a first contention round in the range of $[0, CW_{min}]$, and the modified MrCA (mMrCA) results from allocating the backoff counter of the first contention round in the range of $[1, CW_{min}+1]$.

Figure 6A:
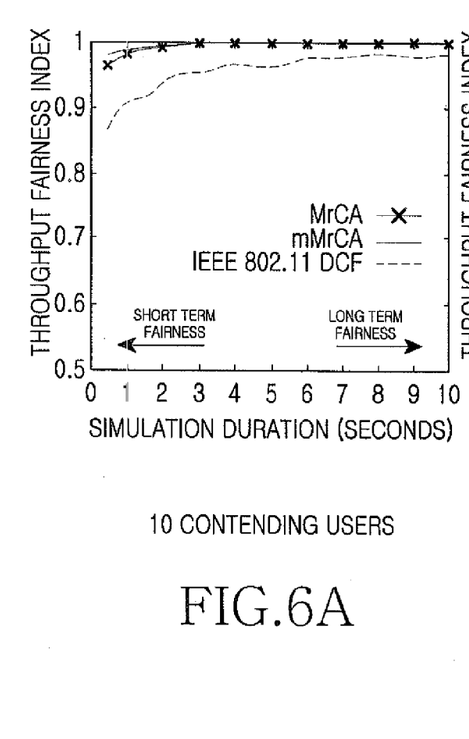
FIGS. 6A to 6C are graphs for comparing a throughput fairness index for all nodes according to an exemplary embodiment of the present invention in comparison with the conventional method.
Figure 6B:
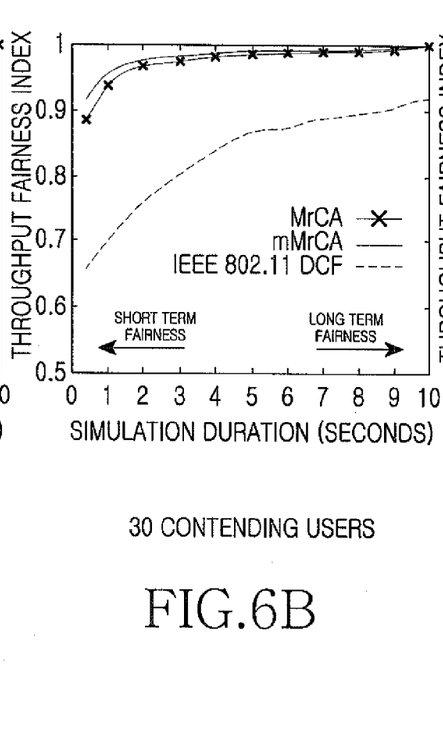
Figure 6C:
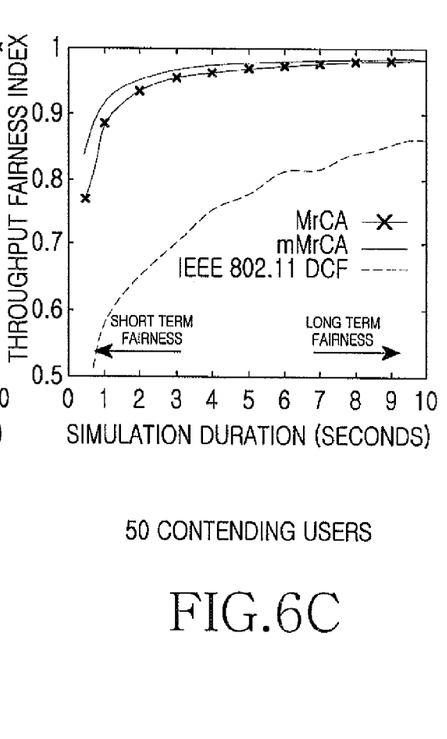

FIGS. 6A to 6C are graphs for comparing a throughput fairness index for all nodes according to an exemplary embodiment of the present invention in comparison with the conventional method.

Referring to FIGS. 6A to 6C, when throughputs of all nodes are equally the same, the fairness index is 1. As the fairness index approaches one, the system is considered to be fairer. A long simulation duration provides results of long-term fairness and a short simulation duration provides results of short-term fairness. The experimentation results show that fairness is significantly improved when using the MrCA of the present invention. In particular, as the number of users increases, the increase in the throughput becomes apparent for the short-term fairness.

According to exemplary embodiments of the present invention, data is transmitted by using MrCA in a wireless network employing a random access channel or a distributed access scheme. Therefore, the number of contending nodes is exponentially decreased for each contention round, resulting in a significant decrease in a collision probability in addition to improving fairness on channel use among users.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention and their equivalents.

What is claimed is:

1. A data transmission method using Multi-round Contention Avoidance (MrCA) in a contending node, the method comprising:
   initializing, by a mobile station, a contention window for each of a plurality of contention rounds;
   setting a backoff counter corresponding to a size of the contention window for each contention round;
   starting from a first contention round to a last contention round, decrementing the backoff counter of a corresponding contention round in a time slot unit; and
   transmitting data when the decremented backoff counter is zero and the corresponding contention round is a last contention round.

2. The method of claim 1, wherein the backoff counter of each contention round is randomly set to a value in the range of $[0, CW]$, where CW denotes a size of the contention window.

3. The method of claim 1, further comprising:
   if the decremented backoff counter is not equal to zero, determining whether a tone signal is received;
   if the tone signal is received, suspending the decrementing of the backoff counter until a specific node, which wins in a current contention, completes the transmission of data; and
   if the tone signal is not received, decrementing the backoff counter of the corresponding contention round in a time slot unit.

4. The method of claim 3, further comprising, if a channel is not used for a time period while in the suspended state, releasing the suspended state and decrementing the backoff counter of the corresponding contention round in the time slot unit.

5. The method of claim 4, wherein the time period is equal to $2(CW_{min}+1)$, where $CW_{min}$ denotes a minimum size of the contention window.

6. The method of claim 1, further comprising, when the decremented backoff counter is equal to zero and when the corresponding contention round is not the last contention round, transmitting a tone signal within one time slot and proceeding to a next contention round to decrement the backoff counter of the corresponding contention round in the time slot unit.

7. The method of claim 1, further comprising, if a collision occurs for the transmitted data, increasing the contention window, starting from the first contention round to a contention round determined by the number of collisions, and setting the backoff counter for each contention round by using the contention window.

8. The method of claim 7, wherein the contention window is increased by using Equation:

$$\begin{cases} CW_i = 2CW_{min} + 1, & \forall_i \in \{i \mid 1 < i \leq j\} \\ CW_i = CW_{min}, & \forall_i \in \{i \mid j < i \leq G\}, \end{cases}$$

where $CW_i$ denotes a contention window of an $i^{th}$ contention round, $CW_{min}$ denotes a minimum size of the contention window, j denotes the number of collisions, and G denotes a last contention round.

9. The method of claim 1, further comprising, if a collision does not occur for the transmitted data, in order to contend for next data transmission, initializing the contention window for each contention round, and setting the backoff counter for each contention round by using the initialization result.

10. The method of claim 9, wherein, if the collision does not occur for the transmitted data, in order to contend for the next data transmission, setting the random backoff counter of the first contention round to a value in the range of [1, CW+1], and setting the random backoff counters of the remaining contention rounds to a value in the range of [0, CW].

11. A data transmission apparatus using Multi-round Contention Avoidance (MrCA) of a contending node, the apparatus comprising:
   an initialization/setup unit for initializing a contention window for each of a plurality of contention rounds and for setting a backoff counter corresponding to a size of the contention window for each contention round;
   a decrementer for decrementing a backoff counter of a corresponding contention round in a time slot unit, starting from a first contention round to a last contention round;
   a comparator for determining whether the decremented backoff counter is zero and whether the corresponding contention round is the last contention round; and
   a data transmitter for receiving the backoff counter which is zero of the last contention round from the comparator and for transmitting data to a receiving side.

12. The apparatus of claim 11, wherein the initialization/setup unit randomly sets the backoff counter of each contention round to a value in the range of [0, CW], where CW denotes a size of the contention window.

13. The apparatus of claim 11, wherein, when the backoff counter of the corresponding contention round is not equal to zero, the comparator determines whether a tone signal is received, and, if the tone signal is not received, outputs the backoff counter of the corresponding contention round to the decrementer, and otherwise, if the tone signal is received, outputs the backoff counter of the corresponding contention round to the decrementer after suspending the decrementing until a specific node which wins in a current contention completes the transmission of data.

14. The apparatus of claim 13, wherein, if a channel is not used for a time period when in the suspended state, the comparator releases the suspended state and outputs the backoff counter of the corresponding contention round to the decrementer.

15. The apparatus of claim 14, wherein the time period is equal to $2(CW_{min}+1)$, where $CW_{min}$ denotes a minimum size of the contention window.

16. The apparatus of claim 11, wherein, when the backoff counter of the corresponding contention round is equal to zero and when the corresponding contention round is not the last contention round, the comparator transmits a tone signal within one time slot and outputs the backoff counter of the corresponding contention round to the decrementer.

17. The apparatus of claim 11, further comprising a collision detector for detecting a collision of the transmitted data, and, if the collision occurs, for controlling the initialization/setup unit to increase the contention window, starting from the first contention round to a contention round determined by the number of collisions.

18. The apparatus of claim 17, wherein, if the collision does not occur, in order to contend for the next data transmission, the collision detector controls the initialization/setup unit to set the backoff counter of the first contention round to a value in the range of [1, CW+1] and to set the backoff counters of the remaining contention rounds to a value in the range of [0, CW].

19. The apparatus of claim 17, wherein the contention window is increased by using Equation:

$$\begin{cases} CW_i = 2CW_{min} + 1, & \forall_i \in \{i \mid 1 < i \leq j\} \\ CW_i = CW_{min}, & \forall_i \in \{i \mid j < i \leq G\}, \end{cases}$$

where $CW_i$ denotes a contention window of an $i^{th}$ contention round, $CW_{min}$ denotes a minimum size of the contention window, j denotes the number of collisions, and G denotes a last contention round.

20. The apparatus of claim 11, further comprising a tone signal transceiver for transmitting a tone signal under the control of the comparator and for outputting a received tone signal to the comparator.

* * * * *